United States Patent
Govindankutty et al.

(10) Patent No.: US 9,639,384 B2
(45) Date of Patent: May 2, 2017

(54) METHOD AND SYSTEM FOR FAST PROVISIONING OF VIRTUAL DESKTOP

(71) Applicants: Sivaprasad Govindankutty, Bangalore (IN); Jubish K. Jose, Bangalore (IN)

(72) Inventors: Sivaprasad Govindankutty, Bangalore (IN); Jubish K. Jose, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 469 days.

(21) Appl. No.: 13/970,847

(22) Filed: Aug. 20, 2013

(65) Prior Publication Data

US 2015/0058837 A1    Feb. 26, 2015

(51) Int. Cl.
*G06F 9/455*    (2006.01)
*G06F 9/445*    (2006.01)
*G06F 9/44*    (2006.01)

(52) U.S. Cl.
CPC ............ *G06F 9/45533* (2013.01); *G06F 8/63* (2013.01); *G06F 9/4401* (2013.01); *G06F 9/44505* (2013.01); *G06F 9/45558* (2013.01); *G06F 2009/45562* (2013.01); *G06F 2009/45575* (2013.01)

(58) Field of Classification Search
CPC .... G06F 9/44445; G06F 9/45; G06F 9/45558; G06F 8/63; G06F 9/4401; G06F 9/44505; G06F 2009/45562; G06F 2009/45575
See application file for complete search history.

(56) References Cited

U.S. PATENT DOCUMENTS 7,356,679 B1    4/2008  Le et al.
7,941,470 B2    5/2011  Le et al.
8,276,140 B1 *  9/2012  Beda, III ............... G06F 9/5077 709/224
8,359,594 B1 *  1/2013  Davidson ............... G06F 9/5077 709/218
9,317,320 B2 *  4/2016  Lee ...................... G06F 9/45558
9,354,896 B1 *  5/2016  Yang ..................... G06F 9/4401

(Continued)

OTHER PUBLICATIONS

Micah Dowty et al., "GPU Virtualization on VMware's Hosted I/O Architecture", [Online], 2009, pp. 73-82, [Retrieved from Internet on Dec. 17, 2016], <http://delivery.acm.org/10.1145/1620000/1618534/p73-dowty.pdf>.*

(Continued)

*Primary Examiner* — Thuy Dao
*Assistant Examiner* — Ziaul A Chowdhury
(74) *Attorney, Agent, or Firm* — Patterson & Sheridan LLP (57) ABSTRACT

Techniques are disclosed for provisioning a virtual desktop. A VM hosting the desktop may be joined to a domain using offline domain join and customized by modifying contents of a virtual disk of the VM, as per the customization requirements, without powering on the VM. While the VM is powered off, a composer application customizes the VM by applying system and user profile configuration changes and network configuration changes, as well as optionally creating a user data disk and pushing to the VM a script for formatting said disk during the VM's first power-on. In addition, while the VM is powered off, the composer invokes a domain joining tool to join the VM to a domain controller without having to reboot the VM. A snapshot is then taken of the VM, after which the VM is then powered on and the script for formatting the user data disk executes.

15 Claims, 4 Drawing Sheets

(56) References Cited

U.S. PATENT DOCUMENTS

| | | | |
|---|---|---|---|
| 2003/0097361 A1* | 5/2003 | Huang et al. .................. 707/10 |
| 2006/0195715 A1* | 8/2006 | Herington ........................ 714/4 |
| 2007/0260831 A1* | 11/2007 | Michael ............... G06F 9/4401 |
| | | | 711/162 |
| 2008/0244028 A1* | 10/2008 | Le ........................ G06F 3/0607 |
| | | | 709/208 |
| 2008/0263658 A1* | 10/2008 | Michael ............... G06F 21/562 |
| | | | 726/22 |
| 2009/0216975 A1* | 8/2009 | Halperin ............ G06F 9/45537 |
| | | | 711/162 |
| 2009/0260007 A1* | 10/2009 | Beaty et al. ...................... 718/1 |
| 2010/0049930 A1* | 2/2010 | Pershin .............. G06F 11/1451 |
| | | | 711/162 |
| 2010/0070678 A1* | 3/2010 | Zhang .................... G06F 9/461 |
| | | | 711/6 |
| 2010/0107113 A1* | 4/2010 | Innes .................. G06F 9/44505 |
| | | | 715/779 |
| 2010/0229185 A1* | 9/2010 | Howarth ............. H04L 12/2602 |
| | | | 719/318 |
| 2011/0035755 A1* | 2/2011 | Huang et al. .................. 718/106 |
| 2011/0040812 A1* | 2/2011 | Phillips ............... G06F 9/45541 |
| | | | 707/822 |
| 2011/0107401 A1* | 5/2011 | Bhai ....................... G06F 21/33 |
| | | | 726/4 |
| 2011/0138449 A1* | 6/2011 | Jirka .................. G06F 9/44505 |
| | | | 726/7 |
| 2011/0185292 A1* | 7/2011 | Chawla et al. ................ 715/760 |
| 2011/0197051 A1* | 8/2011 | Mullin ...................... G06F 8/63 |
| | | | 713/1 |
| 2011/0246904 A1* | 10/2011 | Pinto et al. .................... 715/740 |
| 2011/0265076 A1* | 10/2011 | Thorat ...................... G06F 8/65 |
| | | | 717/172 |
| 2012/0030672 A1* | 2/2012 | Zygmuntowicz et al. ....... 718/1 |
| 2012/0066679 A1* | 3/2012 | Pappas ................ G06F 9/45558 |
| | | | 718/1 |
| 2012/0096461 A1* | 4/2012 | Goswami ........... G06F 9/45558 |
| | | | 718/1 |
| 2012/0110574 A1* | 5/2012 | Kumar ................ G06F 9/45558 |
| | | | 718/1 |
| 2012/0143900 A1* | 6/2012 | Ainslie ............... G06F 9/44505 |
| | | | 707/769 |
| 2012/0144391 A1* | 6/2012 | Ueda ................... G06F 9/45558 |
| | | | 718/1 |
| 2012/0304168 A1* | 11/2012 | Raj Seeniraj et al. ............ 718/1 |
| 2013/0219161 A1* | 8/2013 | Fontignie ............. G06F 9/4401 |
| | | | 713/2 |
| 2013/0263113 A1* | 10/2013 | Cavazza ................... G06F 8/63 |
| | | | 717/178 |
| 2013/0332610 A1* | 12/2013 | Beveridge ..................... 709/226 |
| 2015/0067390 A1* | 3/2015 | Blake .................. G06F 9/45558 |
| | | | 714/15 |
| 2015/0149993 A1* | 5/2015 | Pohlmann ................ G06F 8/63 |
| | | | 717/174 |

OTHER PUBLICATIONS

Yuezhi Zhou et al., "Virtual Disk based Centralized Management for Enterprise Networks", [Online], 2006, pp. 1-6, [Retrieved from Internet on Dec. 17, 2016], <https://www.cs.cmu.edu/afs/cs.cmu.edu/Web/People/ylxie/papers/inm06.pdf>.*

Samer Al-Kiswany et al., "VMFlock: Virtual Machine Co-Migration for the Cloud", [Online], pp. 159-170, ACM—2013, [Retrieved from Internet on Dec. 21, 2016], <http://delivery.acm.org/10.1145/2000000/1996153/p159-kiswany.pdf>.*

Ivan Voras et al., "Criteria for Evaluation of Open Source Cloud Computing Solutions", [Online], 2011, pp. 137-142, [Retrieved from Internet on Dec. 17, 2016], <http://ieeexplore.ieee.org/stamp/stamp.jsp?arnumber=5974009>.*

* cited by examiner

METHOD AND SYSTEM FOR FAST PROVISIONING OF VIRTUAL DESKTOP

BACKGROUND

In virtual desktop infrastructures (VDIs), desktop operating systems, hosted on virtual machines (VMs) running on centralized servers, are delivered as a managed service to end users via a network. Such centralized and automated management of the virtualized operating system, applications, and user data provides increased control and cost savings.

It is not uncommon for system and network configuration changes to be made, and domain membership established, before virtual desktops are assigned to end users, who then access the virtual desktops like any other computer. The following configuration changes may be made to each virtual desktop during customization: hostname changes and network configuration, domain membership configuration, system profile configuration, user profile configuration, etc. Typically, virtual desktop customization requires multiple VM reboots and live customizations. For example, creating domain membership may require a reboot to make the changes take effect, and another reboot may be required after a customization script which customizes operating system settings, profile redirection, registry settings, drive letter settings, etc. is executed so that a reference snapshot, to which the desktop may later be reverted, can be taken.

In large-scale virtual desktop deployments, the customization of VMs according to traditional techniques can be very time consuming. For example, deployment of a single desktop, from first power-on until the creation of the reference snapshot, can take 3 to 10minutes of time. In such a case, 12 to 15 hours may be required to deploy 1000 desktops. Aside from the time requirement, large-scale deployments can also have one or more of the following disadvantages: due to the reboots required for each VM, a boot storm can result; there can be large network traffic between the domain controller and the VMs; the domain controller must be available at the time of desktop customization, as network connectivity problems and unavailability of necessary servers can cause the entire pool of desktops to be in an error state; and, there can be a lack of security since the domain controller's credentials are shared with all clone VMs.

SUMMARY

One embodiment presented herein provides a method for provisioning a virtual desktop hosted on a virtual machine (VM) without rebooting the VM. The method generally includes, before powering on the VM, applying configurations and customizations to a virtual disk of the VM by (1) mounting the virtual disk to an application external to the VM; (2) loading one or more registry hives from the mounted virtual disk; and (3) modifying registry keys in the one or more loaded registry hives. The method further includes joining the VM to a domain before the VM is powered, and powering on the VM.

Other embodiments include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide techniques for provisioning virtual desktops. As used herein, "desktop" refers to an instance of an interactive operating environment provided by a computer operating system and software applications, typically in the form of a display and sound output and keyboard and mouse input, and "provisioning" a desktop refers to creating and deploying a VM which hosts the desktop, including assigning and configuring resources, such as processors, memory, network, and disk storage, associated with the VM, as well as joining the VM to a network domain and customizing and configuring the OS and software which run on the VM. In one embodiment, virtual desktops may generally be joined to a domain using offline domain join and customized by modifying contents of a virtual disk of a VM which hosts the virtual desktop, as per the customization requirements, so that changes to the virtual disk take effect for the virtual desktop without powering on the VM. Doing so eliminates the need for multiple reboots, as required under traditional customization approaches, substantially reducing the time needed to provision virtual desktops.

In one embodiment, a VM composer application customizes a VM by applying system and user profile configuration changes and network configuration changes, as well as optionally creating a user data disk and pushing to the VM a script for formatting said user data disk for user data redirection during the VM's first power-on, while the VM is in a powered off state. As used herein, a user data disk is a distinct virtual disk to which user data is redirected and stored. Keeping user data in a separate disk permits user data to be unaffected by a reversion operation to a previous VM state, among other things, as the hypervisor may know not to change the user data disk during such operations. In another embodiment, the VM's system drive may be mounted to the composer application, and the composer application may edit the VM's registry by loading appropriate registry hives and modifying registry keys therein to make the system, user, and network configuration changes. In addition, while the VM is powered off, the composer application may invoke a domain joining tool such as Microsoft Offline Domain Join (Djoin.exe), to join the VM to a domain controller without having to reboot the VM. A snapshot may be then taken of the VM so that the VM may later be reverted to the snapshot state. Thereafter, the VM is powered on, and the script for formatting the user data disk executed to format said disk for user data redirection. Once the script has executed, the customization is complete and the end user may then log on to the virtual desktop hosted on the VM.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
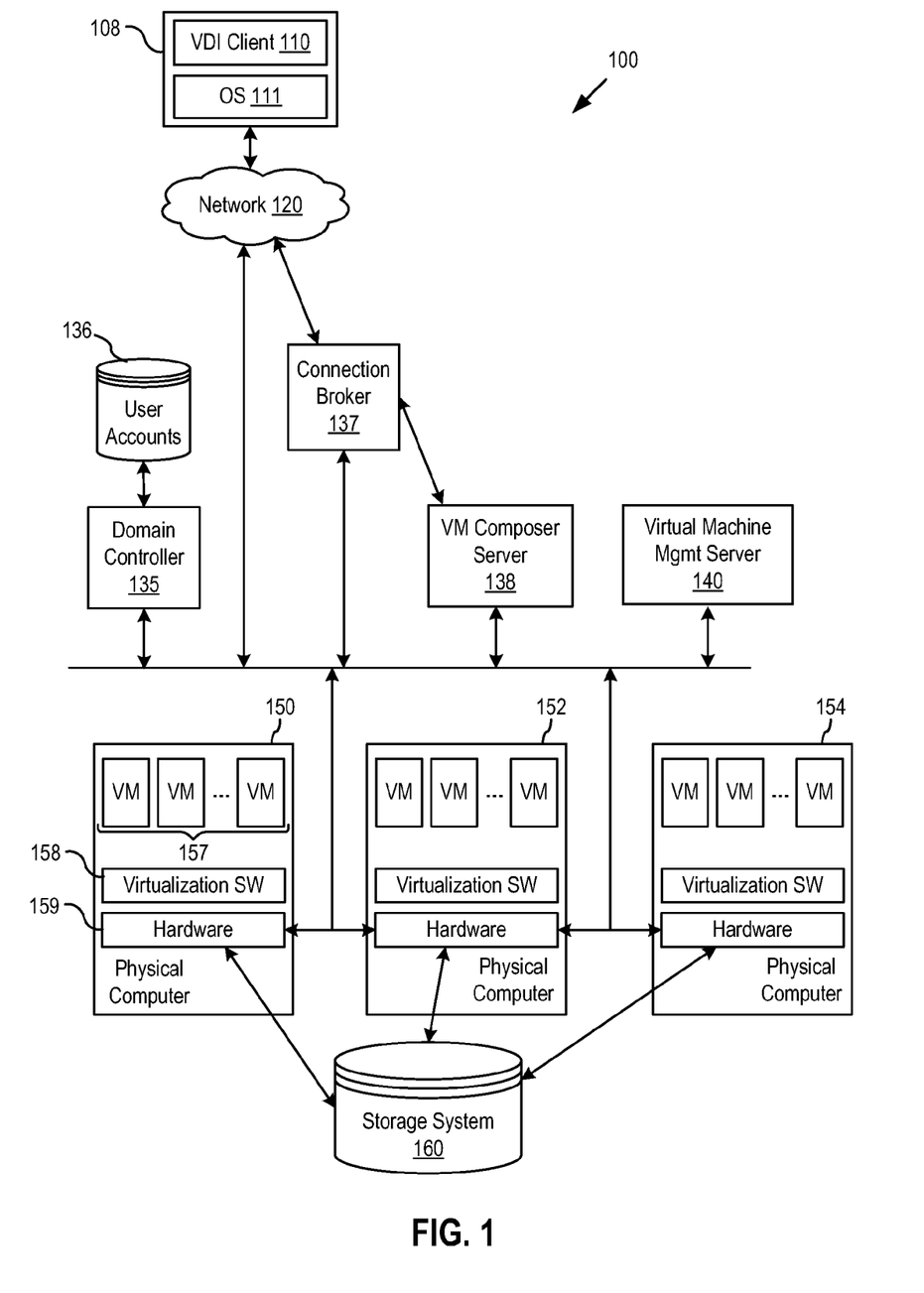
FIG. 1 illustrates components of a virtualized desktop infrastructure system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients provides an interface for the users to access their desktops, which may be running in one of virtual machines 157 or blade server (not shown) in a data center that is remote from the user locations. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 and virtual machines 157 are instantiated on a plurality of physical computers 150, 152, 154, each of which includes virtualization software 158 and hardware 159, is controlled by a virtual machine management server 140, and is coupled to a shared persistent storage system 160.

As further shown, VDI system 100 includes a VM composer server 138. Although shown as a separate server 138, VM composer server 138 may be integrated with VM management server 140 in an alternative embodiment. VM composer server 138 may include a VM composer application (not shown) which is responsible for virtual image management by creating linked clone VMs from a single parent virtual image. As used herein, a "full clone" refers to a complete and independent copy of a VM that does not share virtual disks with the parent VM. In contrast, a "linked clone" is a duplicate of a parent VM that shares the same base disk as the parent VM, with a chain of "redo logs" (also known as "delta disks") to track the differences between the parent VM and the linked clone. To provision virtual desktops, the composer application may make a full clone of a master VM which is a template having content (e.g., OS and applications) for the virtual desktops, and further create linked clones of the full clone to host the virtual desktops. That is, the full clone is created for an entire pool of linked clones, and the linked clones created from the full clone and individually customized. In one embodiment, when connection broker 137 defines a linked clone pool from a master VM image, the composer application interacts with virtual machine management server 140, which consolidates hardware resources and provides said resources to VMs, to create the linked clones. In such a case, the composer application may respond to the connection broker with the provisioned desktops, which may then be pushed by the connection broker to end users. In a particular embodiment, the composer application may be a VMware Horizon View Composer.

In one embodiment, the composer application may further customize a VM by applying system and user profile configuration changes and network configuration changes, as well as optionally creating a user data disk and pushing to the VM a script for formatting said user data disk during the VM's first power-on for user data redirection, while the VM is in a powered off state. As discussed in greater detail below, the composer may mount the VM's system drive, load registry hives from said drive, and modify registry keys in the hives to make the system, user, and network configuration changes. The composer application may access virtual disks of the VM, including the system drive, by invoking an API, such as VMware universal file access (UFA) API, which permits access to the virtual disks that are stored as files. Further, the composer application may invoke a domain joining tool such as Microsoft Offline Domain Join (Djoin.exe), to join the VM to a domain controller before the VM is powered on. A snapshot may be then taken of the VM so that the VM may later be reverted to the snapshot state. Thereafter, the VM may be powered on, and the script for formatting the user data disk executed to format said disk, after which the virtual desktop hosted on the VM can be logged into by an end user.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Figure 2:
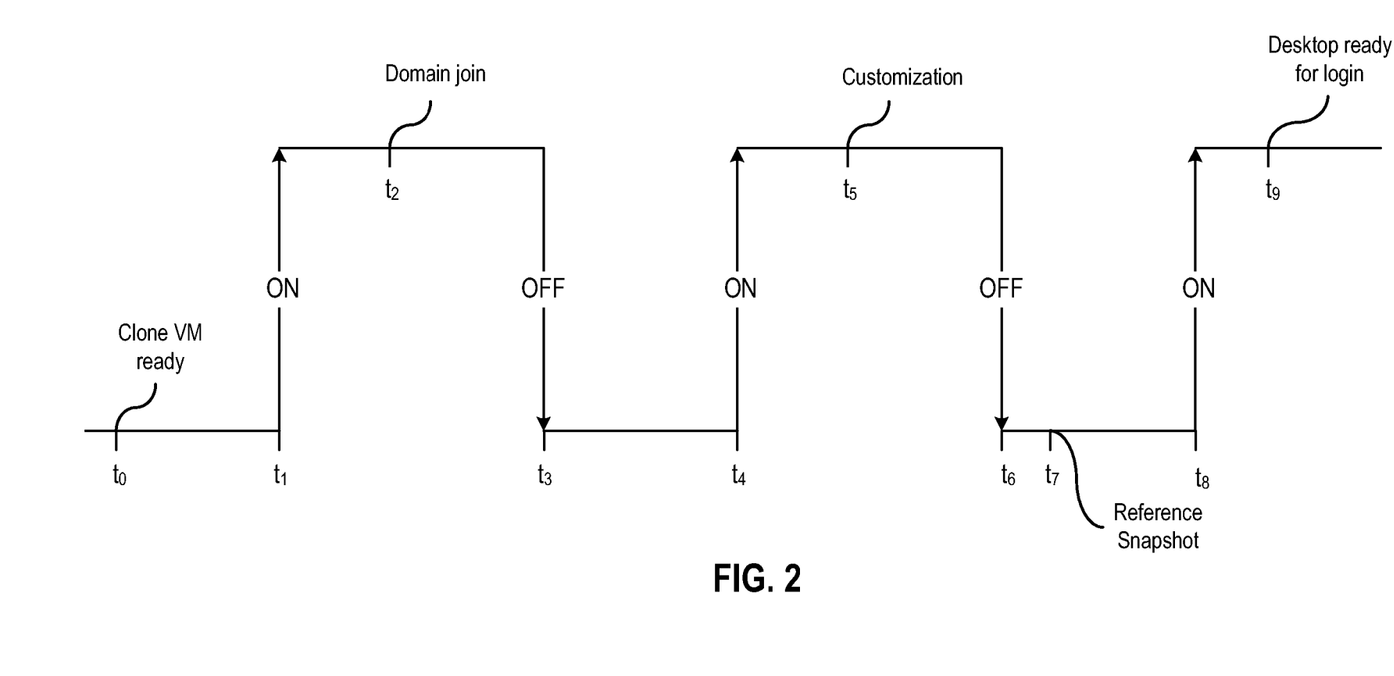
FIG. 2 illustrates an approach for provisioning virtual desktops which requires multiple reboots.

FIG. 2 illustrates an approach for provisioning virtual desktops which requires multiple reboots. The entire time required to provision a virtual desktop according this traditional approach may be approximately 3-10 minutes. As shown, at time $t_0$, a VM is ready for customization. Here, the VM may be a linked clone of a full clone of a master VM. For example, composer application may create a full clone of the master VM and linked clone virtual desktops VMs from the full clone of the master VM, then customize the linked clone VMs before first use.

At time $t_1$, the VM is powered on for the first time. After the VM is powered on, the VM is added to a domain controller at time $t_2$. For example, the Microsoft NetJoin-Domain utility may be used to add the VM. Such traditional approaches for creating domain membership can result in mass network communication with the domain controller where a large number of virtual desktops are being deployed. Further, these approaches typically require a reboot of the VM for changes to take effect. Thus, as shown at time $t_3$, the VM is powered off.

At time $t_4$, the VM is powered on for a second time. At time $t_5$, a customization script is run to further customize the VM. This customization may include operating system settings, profile redirection, registry settings, drive letter settings, etc. Tools for performing such customization include VMware QuickPrep and Microsoft SysPrep. After all customization is completed, a reference snapshot may be taken such that the VM may later be reverted to the snapshot state.

At time $t_6$, the VM is powered off again for the reference snapshot, taken at time $t_7$. After the snapshot is taken, the VM is powered back on at time $t_8$, after which point the virtual desktop is ready for first use at time $t_9$. The VM may be powered-on on a demand basis or based on a spare head room configuration of the pool.

Figure 3:
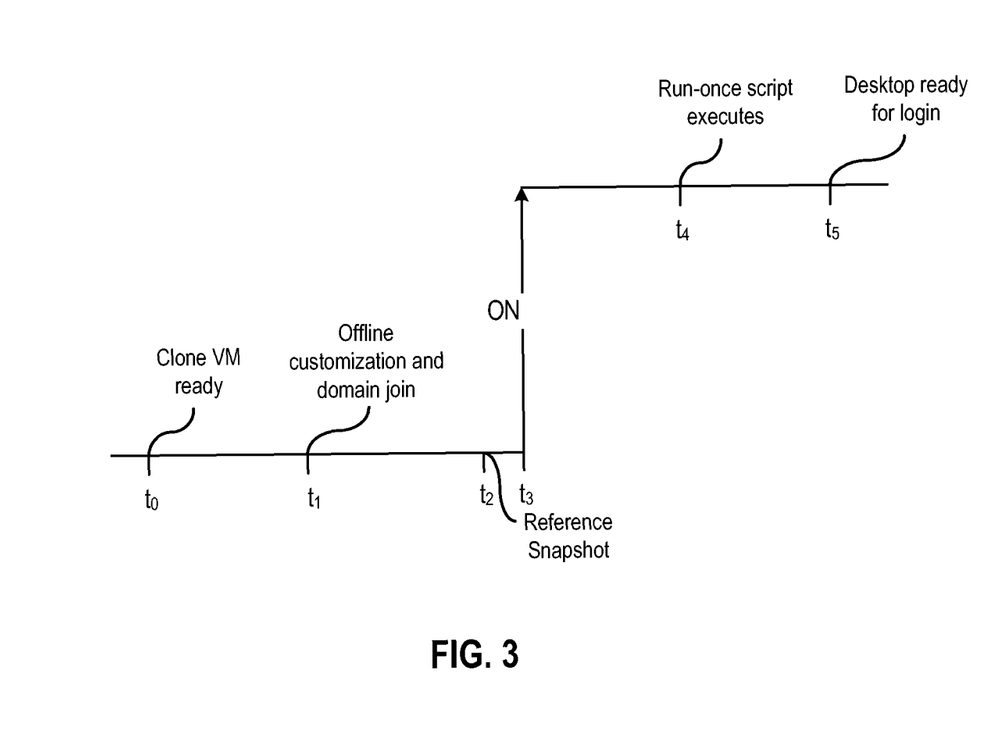
FIG. 3 illustrates an approach for provisioning virtual desktops which does not require rebooting, according to one embodiment.

FIG. 3 illustrates an approach for provisioning virtual desktops which does not require rebooting, according to an embodiment. As shown, at time $t_0$, a VM is ready for customization. In one embodiment, the VM may be ready for customization after being created as a linked clone of a full clone of a master VM, as discussed above. Note, the times $t_0$, $t_1$, etc. in FIG. 3 generally do not correspond to the times $t_0$, $t_1$, etc. in FIG. 2.

At time $t_1$, a composer application performs offline customization of the virtual desktop, and joins the virtual desktop to a domain. As used herein, "offline customization" refers to customization changes made while the VM is not powered on. That is, rather than powering on the VM for live customization, a virtual disk file of the VM is accessed while the VM is in the powered off state. Changes may then be made to the virtual disk, including load registry hives from the disk and modify registry keys in the hives to make system, user, and network configuration changes. Doing so eliminates the need for the second reboot in FIG. 2, as the VM need not be powered off to take a reference snapshot. Similarly, offline domain joining eliminates the need for the first reboot in FIG. 1, as the VM may be joined to the domain upon first being powered-on, with no additional restart required to complete the domain join.

The offline customization may include making changes to system and user profile configuration, network configuration (if required), and, optionally, creating a user data disk and configuring said user data disk. In one embodiment, the offline customization may include mounting the VM's system drive to the composer application, loading appropriate registry hives from the mounted disk, and modifying registry keys in the registry hives. In the Windows® operating system, for example, the SYSTEM and SOFTWARE hives may be loaded, and composer may edit registry keys for system and profile settings to customize the system and user profile configuration. Table 1 shows example registry keys which may be edited in one embodiment. The particular registry keys will generally be OS-dependent. Note, in Table 1, registry key modifications for Hostname are provided as references. In alternative embodiments, domain joining tools such as Djoin.exe may handle hostname and fully qualified domain name (FQDN) configuration changes.

TABLE 1

| Parameter | Key Name | Value Name |
|---|---|---|
| Hostname | HKEY_LOCAL_MACHINE\SYSTEM\ControlSet001\Control\ComputerName\ComputerName | ComputerName |
| | HKEY_LOCAL_MACHINE\SYSTEM\ControlSet001\services\Tcpip\Parameters | Hostname |
| | HKEY_LOCAL_MACHINE\SYSTEM\ControlSet001\services\Tcpip\Parameters | NV Hostname |
| | HKEY_LOCAL_MACHINE\SYSTEM\ControlSet002\Control\ComputerName\ComputerName | ComputerName |
| | HKEY_LOCAL_MACHINE\SYSTEM\ControlSet002\services\Tcpip\Parameters | Hostname |
| | HKEY_LOCAL_MACHINE\SYSTEM\ControlSet002\services\Tcpip\Parameters | NV Hostname |
| Network DNS | HKEY_LOCAL_MACHINE\SYSTEM\ControlSet002\services\Tcpip\Parameters | NameServer |
| User Profile | HKEY_LOCAL_MACHINE\SOFTWARE\Microsoft\Windows NT\CurrentVersion\ProfileList | Default |
| | HKEY_LOCAL_MACHINE\SOFTWARE\Microsoft\Windows NT\CurrentVersion\ProfileList | ProfilesDirectory |
| | HKEY_LOCAL_MACHINE\SOFTWARE\Microsoft\Windows NT\CurrentVersion\ProfileList | Public |

In another embodiment, the composer application may create the user data disk by creating a virtual disk file (e.g., a VMware .vmdk file), and edit a configuration file for the VM (e.g., a VMware .vmx file) to attach the virtual disk to the VM. In such a case, the composer application may further push a run-once script that runs one time during first powering-on of the VM, to format the newly-created disk file for user data redirection, among other things. The run-once script may generally include any one-time activities that are needed for the reference snapshot.

In one embodiment, offline domain joining may be accomplished using a tool such as Microsoft Offline Domain Join. Such tools permit VMs to be joined to a domain without being powered on, and without requiring a restart, thereby reducing the time required for VM deployment. In Microsoft Offline Domain Join, for example, the composer application may call the djoin.exe application pointing to an Active Directory domain controller server and specifying a computer account name. Djoin.exe may then create, in the domain controller, a computer account with the specified name and return a computer account metadata file for the VM, the domain membership configuration of which may be inserted, e.g., by djoin.exe as facilitated/anchored by the composer application, into the Windows directory of the VM.

At time $t_2$, the composer application takes a reference snapshot. As discussed, the reference snapshot is taken so that the virtual desktop may later be reverted to the snapshot state. Note, this snapshot may be taken before all customization is completed, as one or more tasks capable of being performed after the snapshot, such as formatting a user data disk, may be included in the run-once script and performed only after the first power-on. This is in contrast to traditional customization techniques, in which snapshots are taken only after the completion of all customization.

At time $t_3$, after composer takes the reference snapshot, the VM is powered on. If the optional user data disk is created, as discussed above, the run-once script pushed to the VM by the composer application may be invoked upon the powering-on at time $t_4$ to, among other things, format the user data disk for user data redirection. In addition to formatting the disk, any other feasible one-time activity which can be performed after the reference snapshot may also be included in the one-once script. For example, assigning drivers to the user data disk and activation of a Windows® operating system may be included as activities of the run-once script. After the run-once script is executed, the virtual desktop is ready for first use at time $t_5$.

Figure 4:
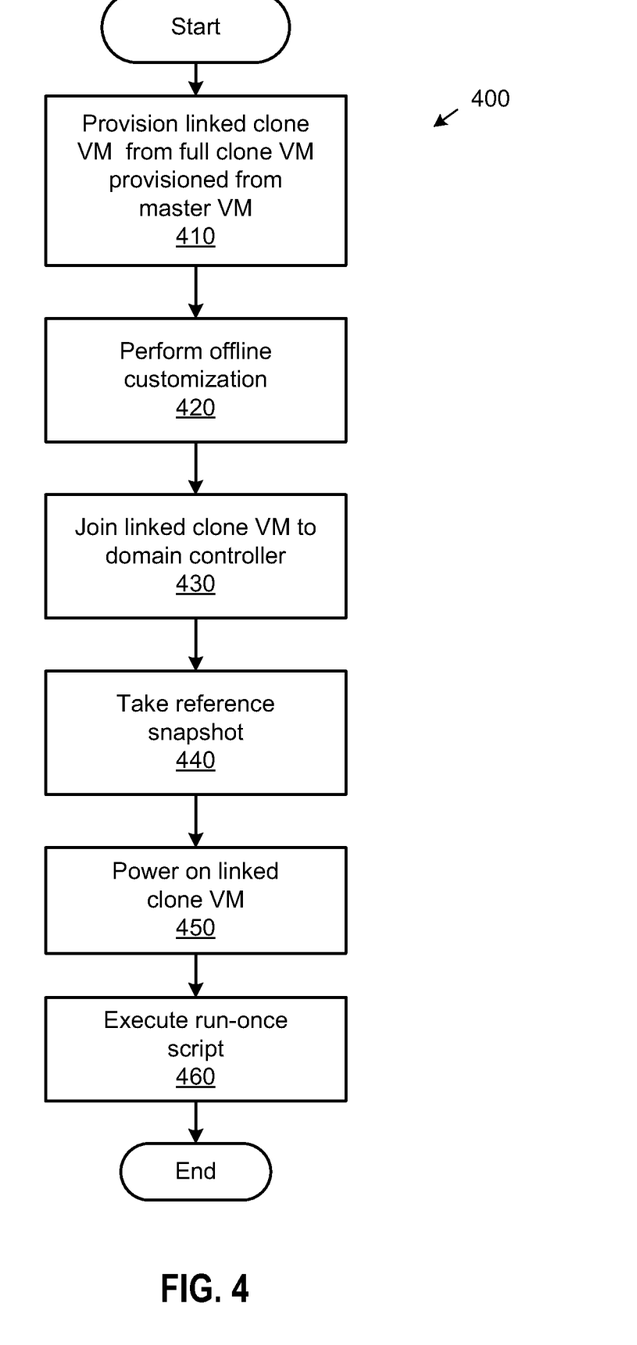
FIG. 4 illustrates a method for provisioning virtual desktops, according to one embodiment.

FIG. 4 illustrates a method 400 for provisioning virtual desktops, according to an embodiment. At step 410, a linked clone VM is provisioned from a full clone VM of a master VM, which serves as the template for cloning VMs. As discussed, the full clone is a complete and independent copy of a VM, whereas the linked clone is a duplicate of the full clone VM that shares a base disk of the full clone VM, with one or more "redo logs" (also known as "delta disks") to track differences between the full clone and the linked clone. Creating linked clones is typically faster than creating full clones.

At step 420, the composer application performs offline customization of the linked clone VM. The offline customization may include mounting a virtual disk of the linked clone to a composer application external to the linked clone VM, and editing a registry on the virtual disk. Traditionally, similar customization must be performed live (i.e., while the VM is powered on), as the customization tasks are handled by the operating system of the VM itself, with input specifying the customization being pushed to the VM by an external application. In such a case, the second reboot illustrated in FIG. 2 is required so that a reference snapshot may be taken of the customized virtual desktop. By instead mounting the VM's virtual disk to an external composer application and making changes directly to said virtual disk, the VM does not need to be powered on during this process, thereby avoiding the need for the second reboot to take the reference snapshot.

As discussed, the offline customization may include making changes to system and user profile configuration, network configuration (if required), and, optionally, creating a user data disk and configuring said user data disk. In one embodiment, the system drive of the linked clone VM may be mounted to the composer application. The composer application may then load registry hives from the mounted disk, and modify registry keys associated with system, user profile, and network configurations. For example, in the Windows® operating system, the composer application may load the SYSTEM and SOFTWARE registry hives into a region of memory managed by the composer using the REG LOAD command, and composer may edit appropriate registry keys to customize the system and user profile configuration. The composer application may then unload the registry hives. In another embodiment, the composer application may create the user data disk and configure said disk by creating a virtual disk file (e.g., a VMware .vmdk file), editing a configuration file for the VM (e.g., a VMware .vmx file) to attach the virtual disk to the VM, and pushing a script that runs during first powering-on of the VM, to format the newly-created disk file for user data redirection, among other things.

At step 430, the composer application initiates offline domain joining for the clone VM. As discussed, offline domain joining permits the VM to be joined to the domain when the VM is initially powered on, without requiring a reboot. In the Windows® operating system, for example, the offline domain joining may be initiated by the composer application and include two stages. In the first stage, the composer application may call the offline domain join application djoin.exe pointing to an Active Directory domain controller server and specifying a computer account name. The syntax for such an operation is: djoin.exe/provision/domain <domain name>/machine <new Clone VM hostname>/savefile <Metadata File Name>. In response, djoin.exe may create, in the domain controller, a computer account with the specified name and return a computer account metadata file for the VM. In the second stage, djoin.exe, as facilitated/anchored by the composer application, may insert the domain membership configuration of the metadata file into the Windows directory of the linked clone VM. The syntax for this operation is: djoin/requestodj/loadfile <Metadata File Name.txt>/windowspath <path to the mounted Windows directory of the linked clone VM>.

At step 440, the composer application generates a reference snapshot of the linked clone VM. The reference snapshot may be taken with, e.g., known techniques so that the virtual desktop may later be reverted to the snapshot state. Note, unlike traditional customization approaches, the reference snapshot here is taken before all customization is completed, as the run-once script for further customization is executed only after the snapshot is taken and the VM powered on. Doing so reduces time needed to provision the virtual desktop and declare the desktop ready, as one-time customization activities are not performed until the VM is initially powered on.

At step 450, the linked clone VM is powered on. At step 460, the linked clone VM runs the run-once script to format the user data disk for user data redirection. As discussed, any other feasible one-time activity capable of being performed after the reference snapshot may also be included in the one-once script. For example, assigning drivers to the user data disk and activation of a Windows® operating system may be included as activities of the run-once script. After the run-once script is executed, the virtual desktop is ready for use.

Advantageously, embodiments described herein eliminate the power cycles required in traditional virtual desktop customization techniques, thereby reducing the time required to customize each VM. Experience has shown that customization of a single VM according to techniques disclosed herein may take a few seconds (e.g., 9 seconds), as opposed to a few minutes (e.g., 6 minutes), required in traditional customization approaches. In a large-scale virtual desktop deployment, techniques disclosed herein may provide considerable time savings. For example, 1000 desktops may be customized in minutes (e.g., 20-30 minutes), as opposed to hours (e.g., 12-15 hours). Further, large boot storms may be avoided, as reboots are not required during customization. In addition, the chances of provisioning errors may also be reduced by eliminating the power cycles and minimizing usage of CPU, memory, and network resources.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of provisioning a virtual desktop hosted on a virtual machine (VM) without rebooting the VM, comprising:
   before powering on the VM on which the virtual desktop being provisioned is hosted:
   applying configurations and customizations to a virtual disk of the VM, by:
   mounting the virtual disk to an application external to the VM;
   loading one or more registry hives from the mounted virtual disk; and
   modifying registry keys in the one or more loaded registry hives, wherein the modified registry keys are associated with at least one of user profile settings, system settings, and network settings that are modified for provisioning the virtual desktop,
   joining the VM to a domain,
   creating a user data disk,
   pushing a script, which is configured to at least format the user data disk, to the VM, and
   taking a reference snapshot of the VM, thereby permitting the virtual desktop to be reverted to a state of the reference snapshot, wherein the reference snapshot is taken prior to powering on the VM a first time and completing customization of the VM;
   powering on the VM; and
   while the VM is powered on, executing the script to perform additional customizations including formatting the user data disk subsequent to powering on the VM.

2. The computer-implemented method of claim 1, wherein applying configurations and customizations to the virtual disk of the VM includes:
   applying system and user profile configurations; and
   applying a network configuration.

3. The computer-implemented method of claim 1, wherein the script further includes activities, other than formatting the user data disk, that are performed after the reference snapshot is taken and the VM is powered on.

4. The computer-implemented method of claim 3, wherein the activities include registering an operating system of the VM.

5. The computer-implemented method of claim 3, wherein the activities include assigning a driver to the user data disk.

6. The computer-implemented method of claim 1, wherein the VM is joined to the domain using Microsoft Offline Domain Join.

7. The method of claim 1, wherein the application external to the VM accesses the virtual disk by invoking an application programming interface (API).

8. A non-transitory computer-readable storage medium comprising instructions for causing a computer system to carry out a method of provisioning a virtual desktop hosted on a virtual machine (VM) without rebooting the VM, the method comprising:
   before powering on the VM on which the virtual desktop being provisioned is hosted:
   applying configurations and customizations to a virtual disk of the VM, by:
   mounting the virtual disk to an application external to the VM;

loading one or more registry hives from the mounted virtual disk; and modifying registry keys in the one or more loaded registry hives, wherein the modified registry keys are associated with at least one of user profile settings, system settings, and network settings that are modified for provisioning the virtual desktop, joining the VM to a domain, creating a user data disk, pushing a script, which is configured to at least format the user data disk, to the VM, and taking a reference snapshot of the VM, thereby permitting the virtual desktop to be reverted to a state of the reference snapshot, wherein the reference snapshot is taken prior to powering on the VM a first time and completing customization of the VM;

powering on the VM; and while the VM is powered on, executing the script to perform additional customizations including formatting the user data disk subsequent to powering on the VM.

9. The non-transitory computer-readable storage medium of claim 8, wherein applying configurations and customizations to the virtual disk of the VM includes:

applying system and user profile configurations; and applying a network configuration.

10. The non-transitory computer-readable storage medium of claim 8, wherein the script further includes activities, other than formatting the user data disk, that are performed after the reference snapshot is taken and the VM is powered on.

11. The non-transitory computer-readable storage medium of claim 10, wherein the activities include registering an operating system of the VM.

12. The non-transitory computer-readable storage medium of claim 10, wherein the activities include assigning a driver to the user data disk.

13. The non-transitory computer-readable storage medium of claim 8, wherein the VM is joined to the domain using Microsoft Offline Domain Join.

14. A system, comprising:

a processor; and a memory, wherein the memory includes a program configured to perform operations for provisioning a virtual desktop hosted on a virtual machine (VM) without rebooting the VM, the operations comprising:

before powering on the VM on which the virtual desktop being provisioned is hosted:

applying configurations and customizations to a virtual disk of the VM, by:

mounting the virtual disk to an application external to the VM, loading one or more registry hives from the mounted virtual disk, and modifying registry keys in the one or more loaded registry hives, wherein the modified registry keys are associated with at least one of user profile settings, system settings, and network settings that are modified for provisioning the virtual desktop;

joining the VM to a domain;

creating a user data disk;

pushing a script, which is configured to at least format the user data disk, to the VM; and taking a reference snapshot of the VM, thereby permitting the virtual desktop to be reverted to a state of the reference snapshot, wherein the reference snapshot is taken prior to powering on the VM a first time and completing customization of the VM;

powering on the VM; and while the VM is powered on, executing the script to perform additional customizations including formatting the user data disk subsequent to powering on the VM.

15. The system of claim 14, wherein applying configurations and customizations to the virtual disk of the VM includes:

applying system and user profile configurations; and applying a network configuration.

* * * * *